United States Patent
McBurney et al.

(10) Patent No.: US 8,259,011 B2
(45) Date of Patent: Sep. 4, 2012

(54) LONG TERM COMPACT SATELLITE MODELS

(75) Inventors: Paul W. McBurney, San Francisco, CA (US); Shahram Rezaei, Danville, CA (US)

(73) Assignee: Furuno Electric Co., Ltd., Nishinomiya (JP)

( * ) Notice: Subject to any disclaimer, the term of this patent is extended or adjusted under 35 U.S.C. 154(b) by 310 days.

(21) Appl. No.: 12/729,720

(22) Filed: Mar. 23, 2010

(65) Prior Publication Data

US 2011/0234456 A1    Sep. 29, 2011

(51) Int. Cl.
*G01S 19/27* (2010.01)
*G01C 21/24* (2006.01)
(52) U.S. Cl. .................... 342/357.66; 701/531
(58) Field of Classification Search ............ 342/357.42, 342/357.66; 701/531
See application file for complete search history.

(56) References Cited

U.S. PATENT DOCUMENTS

| | | | | |
|---|---|---|---|---|
| 6,211,819 B1 * | 4/2001 | King et al. | ............... | 342/357.66 |
| 6,323,803 B1 * | 11/2001 | Jolley et al. | ............... | 342/357.42 |
| 6,429,811 B1 * | 8/2002 | Zhao et al. | ............... | 342/357.66 |
| 6,542,820 B2 * | 4/2003 | LaMance et al. | ............. | 701/478 |
| 7,142,157 B2 * | 11/2006 | Garin et al. | ............... | 342/357.64 |
| 7,548,200 B2 * | 6/2009 | Garin | ........................ | 342/357.66 |
| 7,969,356 B2 * | 6/2011 | King et al. | ............... | 342/357.66 |

* cited by examiner

*Primary Examiner* — Gregory C Issing
(74) *Attorney, Agent, or Firm* — Law Offices of Thomas E. Schatzel, A Professional Corporation

(57) ABSTRACT

An improved network enabled extended ephemeris navigation system includes a network server able to collect ephemeris, clock, and almanac information from orbiting GPS satellites, and to use that information to build up extended ephemeris predictions that will be valid and useful for at least a week. A mobile client is able to request and use the extended ephemeris predictions to search for and track orbiting GPS satellites visible to it. The improvement is characterized by a satellite position and clock compact model construction and database unit that constructs a compact short-term satellite model to be sent first in response to a request for extended ephemeris predictions from the mobile client, and that constructs several consecutive long-term satellite models each representing a unique portion of a day in at least a seven day series.

11 Claims, 6 Drawing Sheets

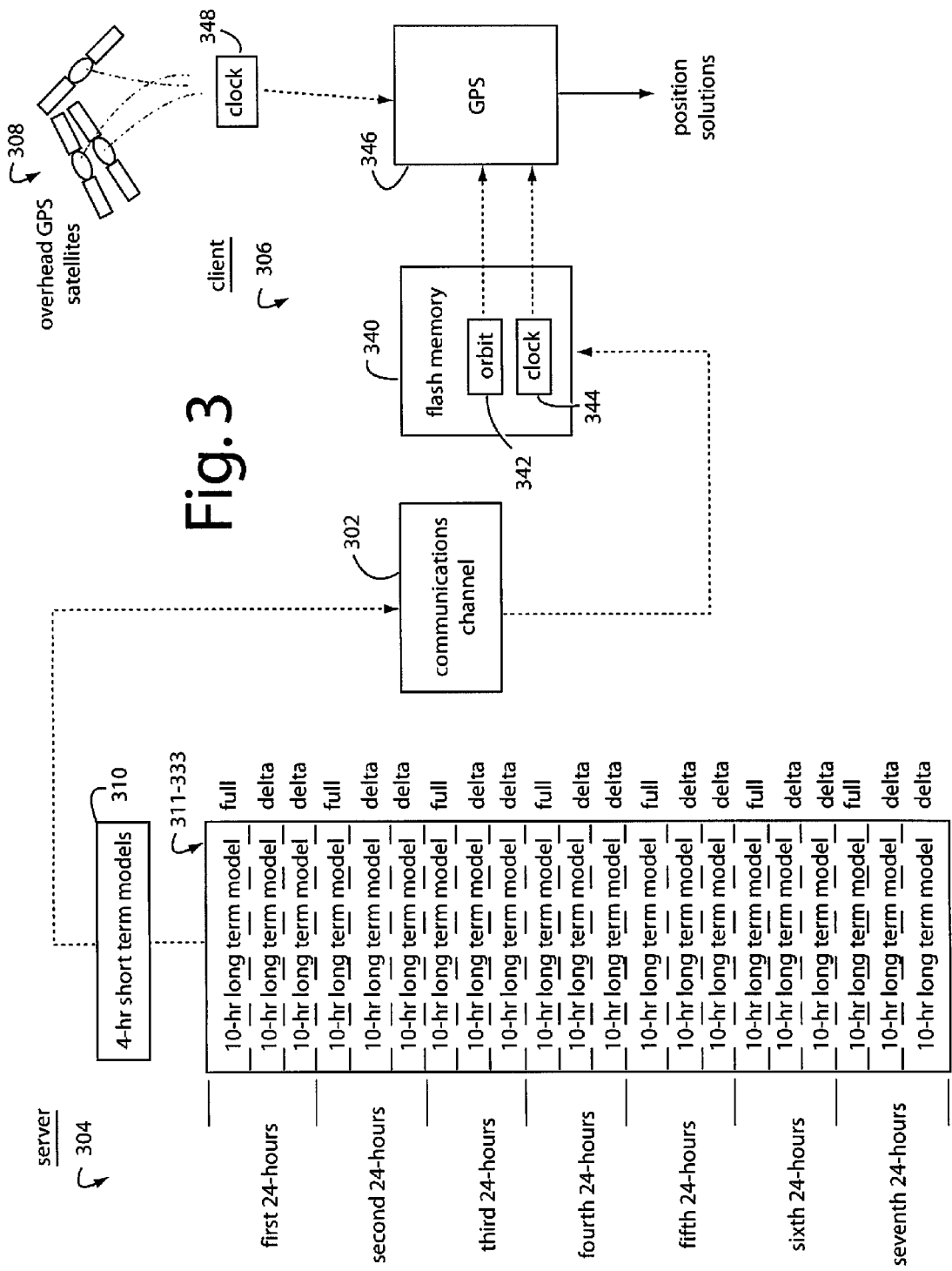

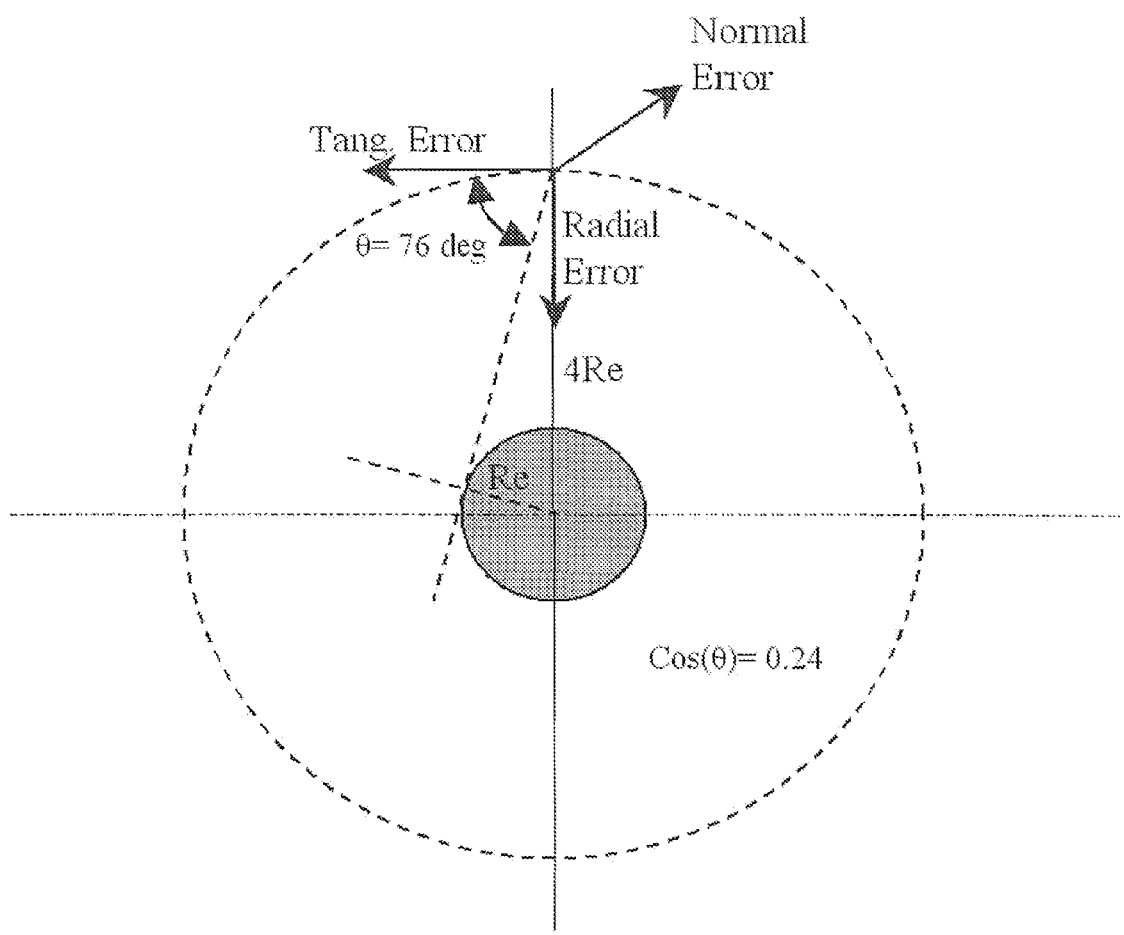

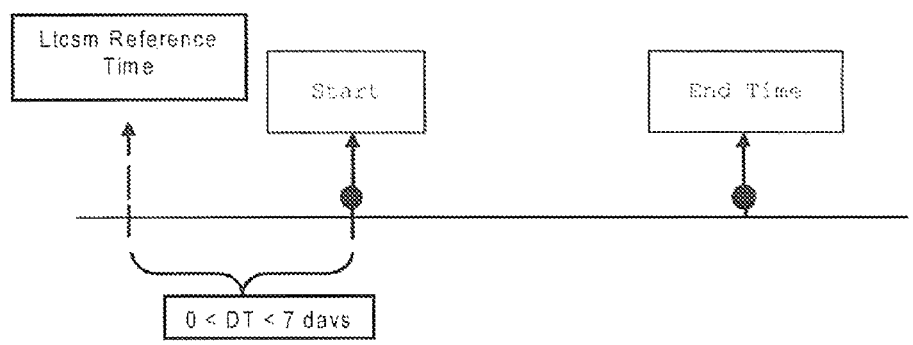
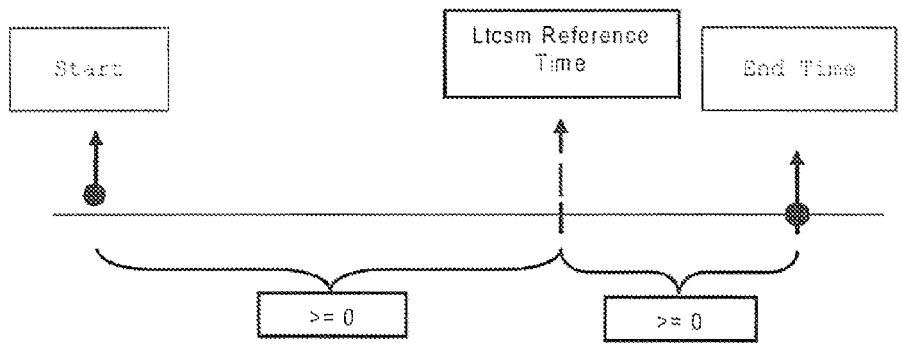
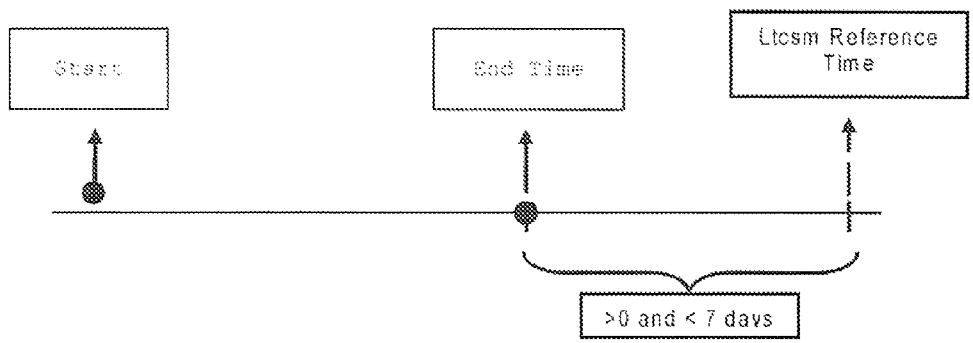

LONG TERM COMPACT SATELLITE MODELS

BACKGROUND OF THE INVENTION

1. Field of the Invention

The present invention relates to navigation receivers, and in particular to building and using long-term models of the global positioning system (GPS) satellite orbits and clocks that allows aided-GPS receivers to download compact data from servers even though their network connections can only be completed infrequently.

2. Description of the Prior Art

Mobile phones and digital cameras now come routinely equipped with GPS navigation receivers that provide position fixes for their users and locations for the photographs taken. These embedded GPS navigation receivers are the assisted type (A-GPS) that can download satellite ephemeris and almanac data from servers, and thus do not have to wait the usual long times otherwise needed to collect the information directly from the satellites themselves.

In the GPS system, at least twenty-four satellites circling the earth at an attitude of 20,200 km are spaced in orbit such that a minimum of six satellites are in view at any one time to a user. Each such satellite transmits an accurate time and position signal. GPS receivers measure the time delay for the signal to reach it, and the apparent receiver-satellite distance is calculated from that. Measurements like this from at least four satellites allow a GPS receiver to calculate its three-dimensional position, velocity, and system time.

The solution to the receiver position depends on knowing where each of the relevant satellites are in three-dimensional space. The respective positions are reported as parameters belonging to a set of Keplarian equations. In conventional GPS systems, the GPS ephemeris includes all the items in Table I.

TABLE I

GPS Ephemeris Message

| Name | Symbol |
|---|---|
| Reference time of ephemeris | toe |
| Square root of semi major axis | $\sqrt{a}$ |
| Eccentricity | e |
| Inclination angle (at time toe) | i0 |
| Longitude of ascending node | $\Omega 0$ |
| Argument of perigee (at time toe) | $\omega$ |
| Mean anomaly (at time toe) | M0 |
| Rate of change of inclination angle | di/dt |
| Rate of change of Longitude of ascending node | $\dot{\Omega}$ |
| Mean motion correction | $\Delta n$ |
| Amplitude of cosine correction to argument of latitude | Cuc |
| Amplitude of sine correction to argument of latitude | Cus |
| Amplitude of cosine correction to orbital radius | Crc |
| Amplitude of sine correction to orbital radius | Crs |
| Amplitude of cosine correction to inclination angle | Cic |
| Amplitude of sine correction to inclination angle | Cis |

During the period of validity of the ephemeris message, it is possible to compute the near exact position and velocity of a satellite and its clock (time) offset from GPS time at any one instant in its flight using the complete GPS ephemeris message information downloaded to the navigation receiver. This of course presumes the GPS ephemeris message can be downloaded.

The computed positions of the GPS satellites are very sensitive to small variations of most of these parameters, so it is necessary to fully communicate them during each ephemeris download. But, as described in United States Patent Application, US 2005/0278116 A1, published Dec. 15, 2005, it has also been observed that the two harmonic corrections to inclination angle, Cic and Cis, are not so critical. eRide, Inc. (San Francisco, Calif.), at least, communicates "compact" satellite models in which one of these two parameters are set to zero and not used in the computation of satellite position. The solution accuracy is not significantly degraded. The second order clock time offset has little impact as well and can be ignored.

It takes a GPS navigation receiver a minimum of 12.5 minutes of continuous operation to be able to collect the complete almanac and ephemeris describing all the orbiting satellites and their trajectories. There is a lot of data, and the 50-Hz modulation used to transfer this information (navData) is very slow. The signal strength at the receivers must also be good in order to be able to demodulate the navData sub-carriers. So a lack of time and/or a lack of strong signal can frustrate a user trying to get a quick first position fix.

Conventional receivers solve this problem by storing the almanac data in previous operational sessions. Thereafter, currently collected ephemeris data is compared to the stored almanac data to determine what needs to be updated. So a rather complete and updated almanac is built up and maintained at the receiver itself that is instantly available at future cold starts.

Conventional satellite ephemeris and almanac data from network servers goes stale rather quickly, so A-GPS navigation receivers need to connect with their servers at least daily. The typical line-of-sight ranging accuracy degrades over twenty-five meters within four hours after the center time-of-ephemeris (toe) of the normally accepted applicability window. Currently, GPS satellites broadcast a new ephemeris every two hours, and the time-of-ephemeris is one hour in the future at the cutover to the new model. Since the GPS satellites move in twelve hours orbits, using models from a previous session will allow position fixes only five hours after the last session. These fixes degrade if the number of visible satellites involved drops to three or less. Given the realities of the ways mobile phones and cameras are used, connecting to the server every day may not be possible or practical.

Other extended assistance techniques have evolved beyond real-time assisted GPS techniques. Instead of waiting on the actual ephemeris information being received from the satellites flying overhead, a synthetic equivalent is predicted and pre-loaded. Such prediction information, or "extended ephemeris," is an estimate of a satellite's future ephemeris that can be good for up to a week. When synthetic assistance is available on a device, the GPS startup times can be significantly reduced compared to real-time assistance techniques, since no server transaction is required.

Two kinds of extended ephemeris solutions are now conventional, network enabled and fully autonomous. Network enabled solutions require a periodic data download from a prediction server. Fully autonomous solutions do not need network support, they learn and generate their own synthetic assistance from their own satellite observations.

Fully autonomous solutions have sometimes inconvenient limitations, they can only predict data for the satellites they have actually seen, and the data derived is usable for up to three days before the accuracy degrades too much. Network enabled solutions provide longer and more accurate predictions, sometimes up to ten days or two weeks for entire constellations.

Although extended ephemeris solutions have become commercially available, they have remained strictly proprietary to each chipset vendor who implemented the feature.

Chipset proprietary network enabled solutions usually compute the prediction data on a server, then periodically download to the portable device. These server-based prediction techniques generally impose substantial weekly data payloads, typically fifty to eighty kilobytes per constellation. For applications where broadband data connectivity may be problematic or too costly, such overhead can be prohibitive.

Rx Networks markets both network-enabled and fully autonomous extended ephemeris solutions that are chipset independent. All the prediction work is done on the device through a common architecture. For network-enabled devices, the weekly data payload is about two kilobytes per constellation, small enough for distribution through SMS, or FM RDS connections. No prediction data is actually transmitted to the client devices.

What is needed are compact long-term models of the GPS satellite orbits and clocks that can enable aided-GPS receivers to go as long as a week between downloads of data from servers to get fresh navigation message information.

SUMMARY OF THE INVENTION

Briefly, an improved network enabled extended ephemeris navigation system embodiment of the present invention includes a network server able to collect ephemeris, clock, and almanac information from orbiting GPS satellites, and to use that information to build up extended ephemeris predictions that will be valid and useful for at least a week. A mobile client is able to request and use the extended ephemeris predictions to search for and track orbiting GPS satellites visible to it. The improvement is characterized by a satellite position and clock compact model construction and database unit that constructs a compact short-term satellite model to be sent first in response to a request for extended ephemeris predictions from the mobile client, and that constructs several consecutive long-term satellite models each representing a unique portion of a day in at least a seven day series.

These and other objects and advantages of the present invention will no doubt become obvious to those of ordinary skill in the art after having read the following detailed description of the preferred embodiments which are illustrated in the various drawing figures.

IN THE DRAWINGS

FIG. 3 is a diagram representing how short-term and long-term compact satellite models are ordered for transmission, used, and updated;

FIG. 4 is a diagram of the body coordinate system used in embodiments of the present invention;

Figure 6A:
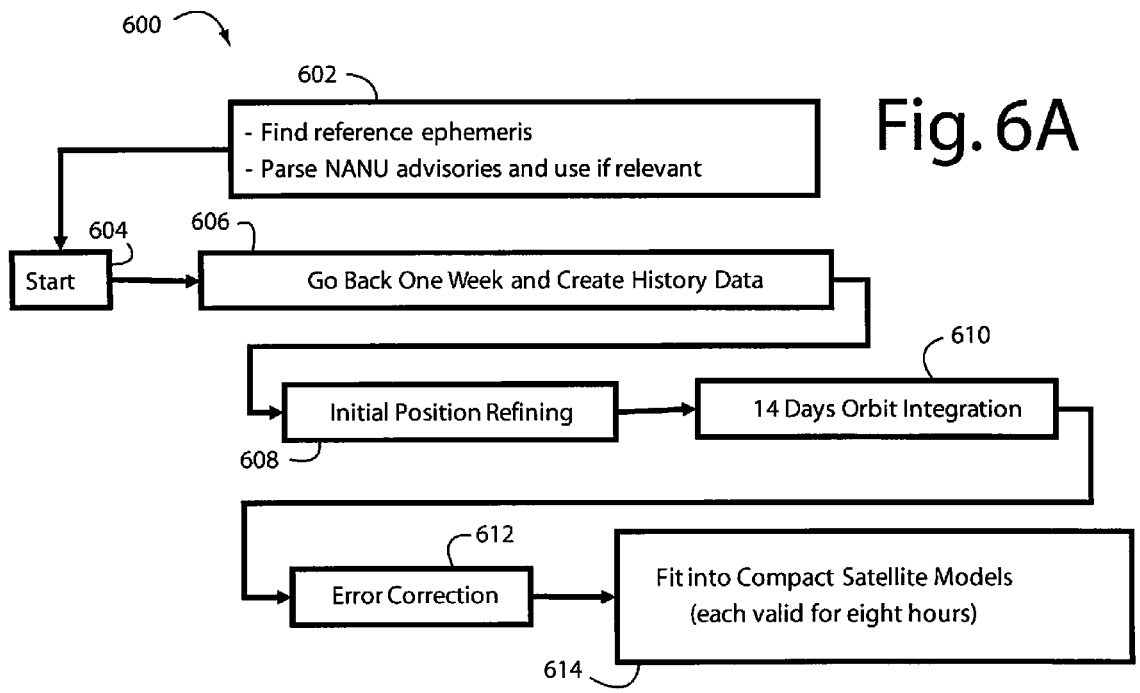
Figure 6B:
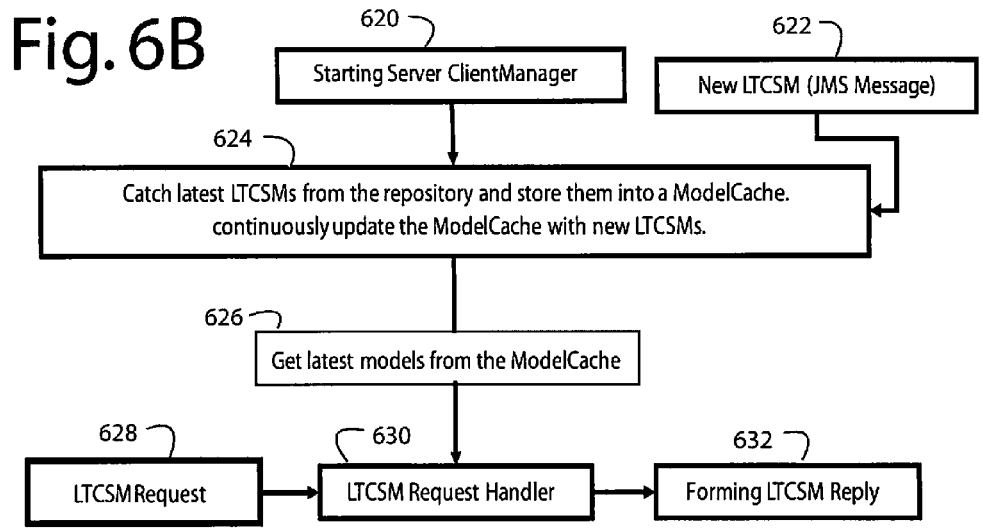

FIGS. 5A-5C diagram Cases I-III in which the LTSCM Reference Time is inside or outside the period spanned by a particular NANU Message; and FIGS. 6A and 6B are flowchart diagrams of a server method for building and supplying LTSCM embodiments of the present invention.

DETAILED DESCRIPTION OF THE PREFERRED EMBODIMENT

Figure 1:
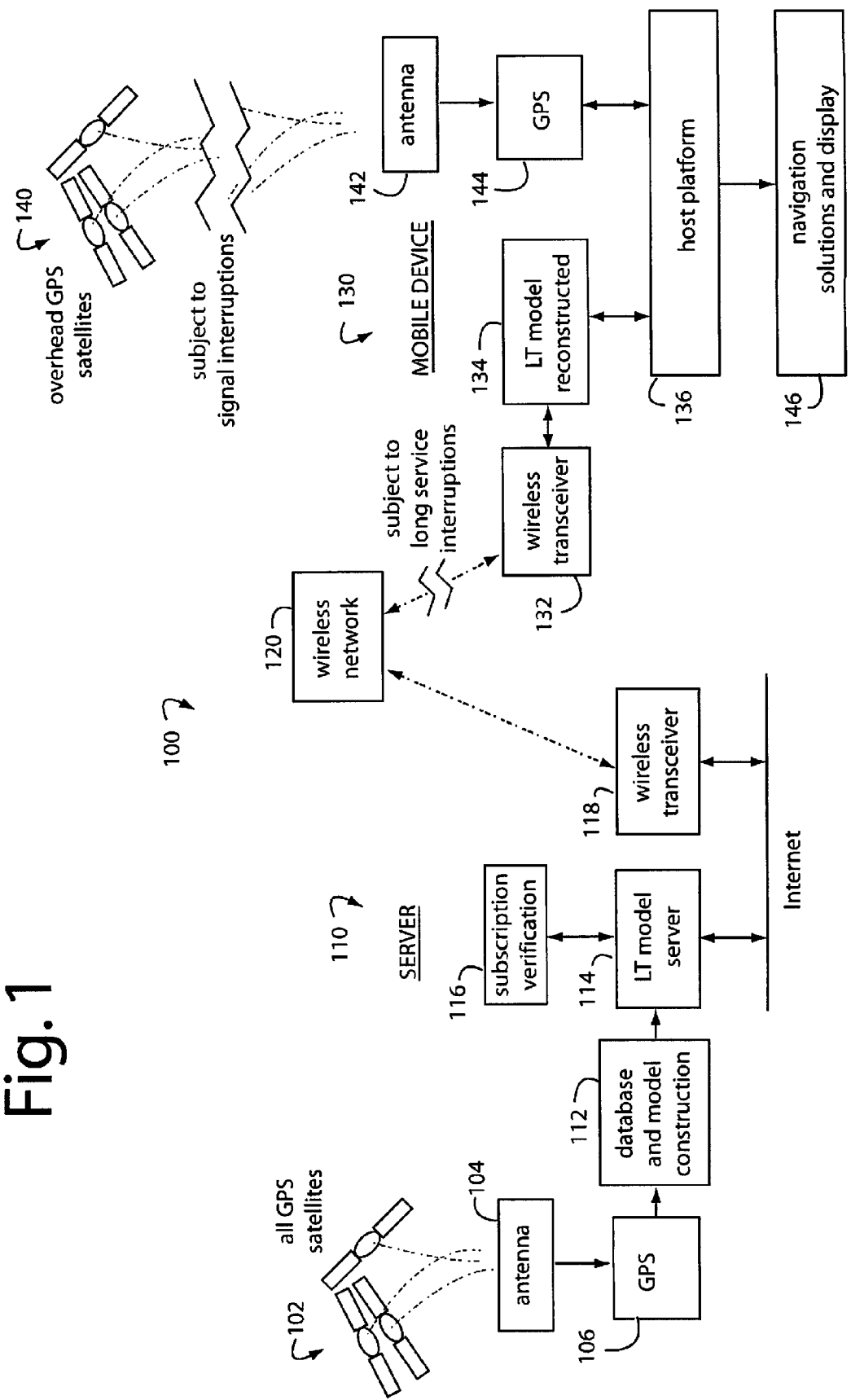
FIG. 1 is a functional block diagram of a system embodiment of a network server and a mobile device for extended ephemeris support of a client GPS receiver.

FIG. 1 represents an assisted GPS navigation receiver system embodiment of the present invention, and is referred to herein by the general reference numeral 100. A constellation of all the orbiting GPS satellites 102 broadcasts a GPS Navigation Message that can be received all around the world.

The GPS Navigation Message includes parameters to describe the GPS satellites positions, clock offsets, and other system parameters. The Navigation Message comprises twenty-five data frames that are each divided into five sub-frames of 300-bit sequences transmitted at 50-bits per second. Each sub-frame therefore requires six seconds, each frame thirty seconds, and the entire set of twenty-five frames takes twelve and a half minutes to completely receive. Sub-frames number one, two, and three are reserved for complete orbit and clock descriptions, and other messages about the satellite that is transmitting them. Sub-frames four and five carry the abbreviated orbit and clock data for all the satellites and system data common to all the satellites. The GPS receivers align the data bits, check them for errors with a parity algorithm, separate them into sets representing particular parameters, scale them, convert the bits into numeric formats and specific units. For example, meters, meters squared, semi-circles, radians, seconds, seconds per second, seconds per second per second, and weeks. Each parameter provides the basis needed by the GPS receiver to derive the position and time estimates. Various algorithms needed are specified in Naystar GPS Joint Program Office, Interface Control Document ICD-GPS-200C.

The GPS Navigation Message and all the ephemerides and almanac describing the orbital positions and clocks for GPS satellites 102 are conventionally accessible from many secondary sources, and some of these are connected to the Internet. For example, the National Geodetic Survey provides the continuously operating reference stations (CORS) service. Each CORS site provides Global Navigation Satellite System (GNSS: GPS and GLONASS) carrier phase and code range measurements in support of three-dimensional positioning activities throughout the United States and its territories. FIG. 1 shows an alternative in which an antenna 104 and GPS receiver 106 are operated continuously to privately collect the entire GPS Navigation Message.

GPS receiver 106 can be a very simple and inexpensive device, all it has to do is download the Navigation Message from all visible GPS satellites. Even though the receiver computes position, it does not require more expensive dual frequency tracking capability to eliminate ionosphere or advanced multipath elimination to improve ranging capability since the algorithms it will feed on the server will only use the Navigation data and not the GPS range related observations.

A network server 110 can include antenna 104 and GPS receiver 106 to feed a proprietary satellite position and clock compact model construction and database 112. Information that is broadcast to the public on the Internet in a Notice Advisory to Naystar Users (NANU) 113 is used by the proprietary satellite position and clock compact model construction and database 112 to build long-term compact satellite models (LTCSM). The NANU Advisories 113 are downloaded daily, for example, from www.navcen.uscg.gov/ gps/ Current/current.oa1.

In order to have complete information available for all satellites all the time, GPS receivers should be positioned at strategic locations around the Earth such that all the GPS satellites are visible within a least two hours and every broadcast ephemeris from any of them can be observed and considered.

A long-term satellite position and clock compact model server 114 is offered to subscribers over the Internet. A subscription verification unit 116 manages the individual subscriptions to generate revenues for its operator. A wireless transceiver 118 or telephone network connection interfaces with a wireless network 120, e.g., Wi-Fi, Bluetooth, mobile phone, GSM, etc.

A mobile device 130, such as a cellular phone or digital camera, is portable, mobile, and subject to being turned on and off many times a day by its user. Mobile device 130 is also subject to frequent signal and service interruptions between wireless network 120 and its own wireless transceiver 132. This makes it impossible or impractical for mobile device 130 to be able to download the proprietary satellite position and clock compact models from server 114 very frequently, or fast enough for the user not to be inconvenienced.

Therefore, in some embodiments of the present invention the proprietary satellite position and clock compact models provided by server 110 are constructed to be viable for at least a week after being downloaded by a subscriber.

A long-term compact model reconstruction unit 134 is supported by a host platform 136. Processing produces current ephemerides and clock estimates in a ICD-GPS-200 type 15-parameter format. Host platform processing strips off the Internet protocol format to extract data that fits better with the GPS receiver. An eRide (San Francisco, Calif.) PVT receiver, for example, receives data in NMEA ASCII format so the Internet packet payload is extracted and converted to an ASCII payload. An eRide MP receiver, for example, can receive the data directly from the host in response to a function call. The host translates the Internet format into the native format of the MP client software.

A visible constellation of GPS satellites 140 is a local subset of GPS satellites 102 that can be measured by an antenna 142 and GPS receiver 144. The complete GPS Navigation Message is essentially already on-hand in long-term compact model reconstruction unit 134, even immediately after a cold start. So all that is needed from the visible constellation of GPS satellites 140 to compute a position fix are pseudorange measurements to the satellites 140. These can be collected rather quickly, and the results are posted by a navigation solutions and display unit 146. In weak signal conditions, including eRide "breadcrumb" technology can provide a reference location that allows a relative position fix within the range of the GPS PRN codephase ambiguity. Such "breadcrumbs" can be obtained with a GSM modem or WiFi access point from an eRide server. The user can also be allowed to provide an approximate location. Combining approximate time within ten seconds, a breadcrumb, and the LTCSM's can enable a very high sensitivity and fast time-to-first-fix (TTFF).

Figure 2:
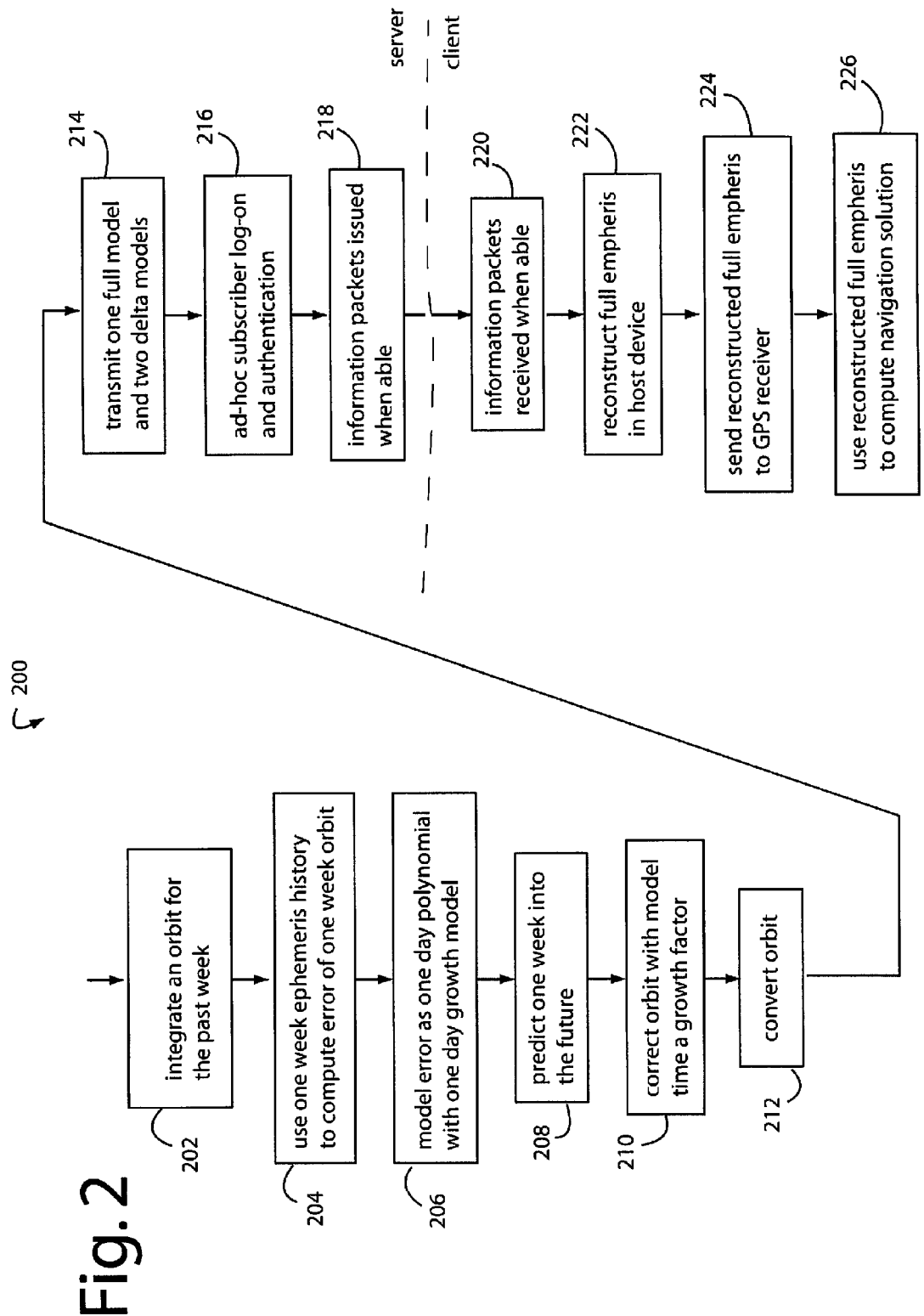
FIG. 2 is a functional block diagram of a method embodiment of the present invention for constructing, communicating, and reconstructing satellite models for extended ephemeris support of a client GPS receiver.

FIG. 2 provides details related to the operation of proprietary satellite position and clock compact model construction and database 112 and long-term compact model reconstruction unit 134, both in FIG. 1. A computer program 200 is split between and respectively executed by server 110 and mobile device 130, for example. A process 202 collects satellite ephemerides and clock estimates as they arrive in real-time in a week-long, seven-day moving window ending at the current time. It also reads the NANU Advisories if available. After verification of the new data, any update is integrated into running satellite clock and position models for respective GPS satellites 102. These clock and position models characterize all the forces acting on each satellite, e.g., solar, lunar, earth gravity, solar pressure, etc., and propagate them in x,y,z, Earth-Centered, Earth-Fixed (ECEF) position format. In some embodiments, the verification of updated satellite ephemeris and clock estimate includes receiving the same new information at least four times from the GPS receiver network since the GPS Parity protection has a false pass error rate as high as 1/64. The clock and position models are packed into data packets in a way that helps conserve communication channel bandwidth.

In a process 204, a one week collection of ephemeris history is used to compute the actual errors second-by-second of one week of history orbit, in terms of delta x, delta y, delta z, in ECEF coordinate system. A process 206 transforms the errors into satellite body coordinate system (with radial, tangential, normal axes). The origin of the body coordinate system is at center of the satellite, the radial axis is toward center of Earth, the tangential axis is tangent to orbit of the satellite, and the normal axis is perpendicular to the orbit.

Process 206 models radial, tangential, and normal errors as a one-orbital period (11 hours and 58 minutes) reference curve with polynomial growth models for minimums and maximums of each error component. When the errors are graphed on a one-orbital period basis, they will be seen to have a repeating characteristic shape. Such repeating characteristic shape will have a measureable timebase that grows into the future.

A process 208 uses reference curves and polynomial growth models to predict radial, tangential, and normal errors one week in future. It also predicts clock errors one week into future. A process 210 corrects the orbit with the expected error derived from process 208.

Conventional modeling uses four-hour, ninth-order polynomials to describe satellite orbits. In contrast, a process 212 uses a Keplarian model to convert the orbit to something more readily useful to a conventional GPS receiver. An elliptical model 15-parameter model (Table-I) of both position and clock is output, and is similar to that defined in NAVSTAR Global Positioning System, Interface Specification IS-GPS-200, Revision D, 7 Dec. 2004. An extended ephemeris like that defined by 3GPP is used.

A LTCSM Keplerian solver is needed to solve for the Keplerian parameters, e.g., ephemeris parameters, that best fit a series of satellite X, Y, and Z position samples in an ECEF coordinate system. The LTCSM Keplerian solver estimates the values of fifteen states that form the Keplerian parameters, $$\vec{X} = [a, e, i0, M0, \Delta n, di/dt, \omega, \Omega 0, \dot{\Omega}, Crs, Crc, Cus, Cus, Cis, Cic].$$

Components of vector $\vec{X}$ are related to known position components X, Y, Z through the well known non-linear ephemeris equations. See for example, ICD-GPS-200, http://ocw.mit.edu/NR/rdonlyres/Earth—Atmospheric—and-Planetary-Sciences/12-540Spring-2008/LectureNotes/icd200cw1234.pdf). Using a finite order Taylor Series (http://en.wikipedia.org/wiki/Taylor_series), the non-linear ephemeris equations are linearized to find linear equations that will correlate the Keplerian parameters to the X, Y, Z positions. A conventional least squares method is then used to solve the Keplerian parameters.

To convert the $[x_i, y_i, z_i]_{i=1}^n$ to ephemerides, recognize that each ephemeris comprises fifteen parameters, $a, e, i0, M0, \Delta n, di/dt, \omega, \Omega 0, \dot{\Omega}, Crs, Crc, Cus, Cuc, Cis, Cic$, So the goal is to find these parameters with some initial estimates of time and the true samples collected for [x,y,z], $$X(\text{time}=t) = f(a, e, i0, M0, \Delta n, di/dt, \omega, \Omega 0, \dot{\Omega}, Crs, Crc, Cus, Cuc, Cis, Cic),$$

Similarly, Y(t) and Z(t).

The X,Y,Z equations are non-linear, so a Taylor expansion is used to linearize them, $$X(t) = \hat{x}(t) + \sum_{j=1}^{LS} \frac{\delta x}{\delta p_j}\bigg|_{\vec{p}=\hat{\vec{p}}}^{(p-\hat{p})},$$

Similarly, Y(t) and Z(t). The "hats" symbolize the initial estimates of the parameters.

Mean anomaly, $M_k = M_o n(t-t_{oe}) = E_k - e \sin E_k$.     (1)

A first order Taylor expansion is used to linearize Equation (1) and fink $E_k$ in terms of $M_k$ and e, $$M_o + n\underbrace{\left(n(t-t_{os})\right)}_{=\Delta t} = E_k(1 - \hat{e}\cos\hat{E}_k) + \hat{E}_k \hat{e}\cos\hat{E}_k - e\sin\hat{E}_k, \quad (2)$$

$$\xrightarrow{yields} \hat{E}_k = \frac{M_o + n(\Delta t) - \hat{E}_k \hat{e}\cos\hat{E}_k - e\sin\hat{E}_k}{1 - \hat{e}\cos\hat{E}_k},$$

Here, $\hat{E}_k - \hat{e}\sin\hat{E}_k = \hat{M}_k$.     (3)

Differentiating Equation (2) and evaluating them with the initial estimates, $$\frac{\delta E_k}{\delta e} = \frac{\sin\hat{E}_k}{1 - \hat{e}\cos\hat{E}_k}, \quad (4)$$

$$\frac{\delta E}{\delta M_0} = \frac{1}{1 - \hat{e}\cos\hat{E}_k}, \quad (5)$$

$$\frac{\delta E}{\delta n} = \frac{\Delta t}{1 - \hat{e}\cos\hat{E}_k}, \quad (6)$$

$$\sin\gamma_k = \frac{\sqrt{1-e^2}\sin E_k}{1 - e\cos E_k} \xrightarrow{yields} \quad (7)$$

$$\frac{\delta\sin\gamma_k}{\delta e} = \frac{(\sin\hat{E}_k)(\hat{e} - \cos\hat{E}_k)(-2 + \hat{e}^3 + \hat{e}\cos\hat{E}_k)}{\sqrt{1-\hat{e}^2}(1 - \hat{e}\cos\hat{E}_k)^3},$$

this process continues on in conventional techniques to eventually arrive at the Keplarian models using the Least Squares process.

In order to reduce the transmission times, a process 214 transmits one full model and then two delta models, e.g., in Character Studio Motion Capture (CSM) format. The CSM format is an ASCII file that is used to import positional marker data from various motion capture systems into Character Studio to animate bipedal characters.

Process 214 does not send some sinusoidal correction terms, nor the second order clock model. A process 216 allows ad-hoc logons of paid or otherwise authorized subscribers. A process 218 downloads the information as possible. A process 220 receives the information and stores it in predefined memory blocks. A process 222 reconstructs the full ephemerides in a host device program. A process 224 sends the results in a format like Table-I to the GPS receiver and its flash memory. The GPS receiver can also reconstruct the full ephemerides. A process 226 computes the navigation solution from the reconstructions.

FIG. 3 represents a data packet compacting method 300 for formatting short-term and long-term satellite models for all the GPS system satellites (SV), sending them in data packets, and then using the models when directly obtained clock estimates and ephemerides are not possible or practical. A communications channel 302 between a network server 304 and a mobile client 306 is very limited and slow, and this necessitates an efficient communications format with which to pass extended ephemeris predictions for all thirty-two SV's for the next week. The data packets communicated to client 306 must have minimal overhead.

If the client 306 needs immediate ephemeris assistance to begin searching for overhead satellite constellation 308, a four-hour short-term satellite model 310 is sent first so the mobile client 306 can begin searching.

No one long-term model can be used to describe the satellite orbit or clock for an entire week into the future with sufficient accuracy for position fixing. The orbit and clock are just too complex. Therefore, the period of a week into the immediate future is divided into three, eight-hour segments for each of seven days and given a one hour buffer at the beginning and ending, e.g., twenty-one ten-hour long-term models 311-333 for every possible GPS satellite. These are forwarded after the four-hour short-term satellite model 310 is sent, and they are optimized for memory storage. Eight-hour segments provide a good tradeoff of fit error to a calculated orbit that does not contribute errors beyond the error of the orbit.

The first of every three ten-hour long-term models 311-333 are sent with "full" details, e.g., for the first third of every day in the following week. The two ten-hour long-term models 311-333 that follow the full models are sent as "delta" details, e.g., only the data that is changed from the immediately preceding full long-term model is actually sent. Thus conserving on the communications channel bandwidth. Such is similar to standardized video compression techniques, and is referred to herein as "compact" long-term satellite models. A typical delta model requires thirty-nine bytes, as described later in connection with FIG. 6. A typical full model requires seventy-three bytes. Given that, Fit Time Interval=8 hours
Number of Full Models per satellite per day=1
Number of Delta Models per satellite per day=2
Size of Each Full Model=73 Bytes
Size of Each Delta Model=39 Bytes
Number of operational satellites at any time=31
Number of Days=7

The total file size for long-term compact satellite models spanning one week will be 31*7*(73+2*39), or 31.99 kilobytes (kB).

An important and distinguishing aspect of embodiments of the present invention is being able to communicate the compact models for an entire week into the future with less than thirty-two kilobytes.

The four-hour short-term satellite model 310 is a "compact" short-term satellite model (CSM) as described above where eRide removes certain terms that have little impact on accuracy. If the client 306 sends its position along with its request for satellite models to server 304, then server 304 can reduce the four-hour short-term satellite model 310 to those corresponding to overhead GPS satellite 308. The CSM's can serve as an effective almanac for searching and acquisition, instead of using the long-term models. These data are being constantly being cycled in and out of memory, and a model may not be available as the host program is choosing an appropriate LTCSM. Such CSM buffer is a better pseudo-almanac for GPS searching.

As is also described in United States Patent Application, US 2005/0278116 A1, published Dec. 15, 2005, the four-hour short-term satellite model 310 used here always omits at least one of the Cic and Cis parameters in the communication and the computation of its position solution. The average error that results in these omissions is on the order of only a few meters for each satellite.

A second method omits only one of the two parameters, e.g., the one that has the smallest effect on the position. The inclination correction is $\Delta=C_{is} \sin(2\phi_k)+C_{is} \cos(2\phi_k)$ where $\phi_k$ is the argument of latitude, one of Cis or Cic is omitted depending on $\text{Min}(C_{is} \sin(2\phi_k), C_{ic} \cos(2\phi_k))$. The average error is reduced about four fold when only one of the parameters is omitted in the computation, e.g., the position solution error is less than one meter.

When the satellite models 310-333 arrive at client 306 they are stored in a flash memory 340 as orbit predictions 342 and clock predictions 344 for position fixing only. In lower cost receivers without a dedicated flash memory, the long term data base is stored in the host memory, and the host and receiver are connected such that the current LTCSM can be pushed into the receiver volatile memory. In some embedded ROM-only PVT chips, the LTCSM's are stored in volatile SRAM only during operation. At startup, the GPS time is determined by the host or GPS receiver, by whichever has a real time clock. This is communicated in Keplarian format like that outlined in Table-I. These orbit predictions 342 and clock predictions 344 can used by a GPS navigation receiver 346 for cold starts and high sensitivity modes where orbit and clock data are not immediately available directly from overhead GPS satellites 308. Once GPS navigation receiver 346 is tracking overhead GPS satellites 308, the Navigation Message may be available and clock information 348 can be extracted directly.

The clock information 348 is used to update or replace clock predictions 344 as the opportunities arise. The clock predictions 344 included in the ten-hour long-term models 311-333 tend to degrade much faster than do the orbit predictions 342. If it is possible to obtain the latest clock model, that model is stored and supersedes any clock model previously provided by the server.

Spacecraft orbits are predictable because they are acted on by well-known forces. But the satellite clocks are derived from atomic clock standards, and will have random perturbations are impossible to predict. For this reason, the server should always provide the most recently observed ephemeris based clock model at the time of sending the LTCSM. Although a lot of effort is made to improve the fit, the resulting predictions did not usually yield an overall statistical improvement in the clock prediction.

Long term compact satellite model (LTCSM) embodiments of the present invention use an error correction algorithm common to both the polynomial and Keplerian models. Table-II lists definitions for some of the terminology involved as used herein.

TABLE II

| definitions |
|---|
| Reference Start Time: Beginning time of the LTCSM seven day use time. |
| Integration Start Time: Beginning time of the integration, seven days prior to Reference Start Time. |
| Raw Model: Satellite model before error correction. |
| Corrected Model: Satellite model after error correction. |
| History Week: The week prior to the reference start time which ephemeride are available and actual error are computed. |
| Use Week: The week in future starting at the reference start time which ephemeride are not yet available. |
| Raw Model Error: Error of the raw model when compared to ephemeris. The error pattern is learned from the raw errors of the history week. |
| Predicted Error: Expected errors of the raw model projected into the use week. |

Referring once again to NANU Advisories 113 in FIG. 1, Table-III is an example of a NANU page that published on Apr. 1, 2009. The start time of a Delta V maneuver was, GPS Week number 501 and time-of-ephemeris (TOE) 403200 second. The ending time of the Delta V maneuver was, GPS Week number 501 and TOE 455400 second. The information to focus on here is in Section 2.A, Forecasts, which announces on day 91 (01 APR 2009) that between day 092/1600 and day 093/0630, a Delta-V maneuver (FCSTDV) would occur for PRN 18. This event and PRN 18 are selected for use here to describe the desired model generator behavior around the example NANU.

TABLE III

Example NANU Page

GPS OPERATIONAL ADVISORY　　　　　　　　　091.OA1
SUBJ: GPS STATUS 01 APR 2009
1. SATELLITES, PLANES, AND CLOCKS (CS=CESIUM RB=RUBIDIUM):
A. BLOCK I: NONE

| B. BLOCK II: | PRNS | 1, | 2, | 3, | 4, | 5, | 6, | 7, | 8, | 9, | 10, | 11, | 12, | 13, | 14 |
|---|---|---|---|---|---|---|---|---|---|---|---|---|---|---|---|
| PLANE: | SLOT | B2, | D1, | C2, | D4, | B6, | C5, | A6, | A3, | A1, | E3, | D2, | B4, | F3, | F1 |
| CLOCK: | | RB, | RB, | CS, | RB, | RB, | RB, | RB, | CS, | CS, | CS, | RB, | RB, | RB, | RB |
| BLOCK II: | PRNS | 15, | 16, | 17, | 18, | 19, | 20, | 21, | 22, | 23, | 24, | 25, | 26, | 27, | 28 |
| PLANE: | SLOT | F2, | B1, | C4, | E4, | C3, | E1, | D3, | E2, | F4, | D5, | A5, | F5, | A4, | B3 |
| CLOCK: | | RB, | RB, | RB, | RB, | RB, | RB, | RB, | RB, | RB, | CS, | RB, | RB, | CS, | RB |
| BLOCK II: | PRNS | 29, | 30, | 31, | 32 | | | | | | | | | | |
| PLANE: | SLOT | C1, | B5, | A2, | E5 | | | | | | | | | | |
| CLOCK: | | RB, | CS, | RB, | RB | | | | | | | | | | |

2. CURRENT ADVISORIES AND FORECASTS:
A. FORECASTS: FOR SEVEN DAYS AFTER EVENT CONCLUDES.
NANU　　MSG　　DATE/TIME　　　　　　　　　　　PRN　　TYPE　　　　　　　SUMMARY
(JDAY/ZULU TIME START - STOP)
2009022　　261836Z　　MAR 2009　　　　　　　　18　　FCSTDV　　092/1600-093/0630
B. ADVISORIES:
NANU　　MSG DATE/TIME　　　　　PRN　TYPE　　　　　　SUMMARY (JDAY/ZULU TIME START - STOP)

TABLE III-continued

Example NANU Page

C. GENERAL:

| NANU | MSG | DATE/TIME | PRN | TYPE | SUMMARY (JDAY/ZULU TIME START - STOP) |
|---|---|---|---|---|---|
| 2009020 | 202158Z | MAR 2009 | | | GENERAL /-/ |
| 2009021 | 241836Z | MAR 2009 | 01 | LAUNCH | /-/ |
| 2009023 | 262212Z | MAR 2009 | | | GENERAL /-/ |

3. REMARKS:
A. THE POINT OF CONTACT FOR GPS MILITARY OPERATIONAL SUPPORT IS THE GPS OPERATIONS CENTER AT (719)567-2541 OR DSN 560-2541.
B. CIVILIAN: FOR INFORMATION, CONTACT US COAST GUARD NAVCEN AT COMMERCIAL (703)313-5900 24 HOURS DAILY AND INTERNET HTTP://WWW.NAVCEN.USCG.GOV
C. MILITARY SUPPORT WEBPAGES CAN BE FOUND AT THE FOLLOWING HTTPS://GPS.AFSPC.AF.MIL/GPS OR HTTP://GPS.AFSPC.AF.MIL/GPSO

FIGS. 5A-5C help show how the relationship in time between the LTSCM Reference Time and the period spanned by the NANU creates four cases, each of which require different handling by the satellite position and clock compact model construction and database 112.

In Case-I: The reference time is before the start time of NANU, but not older than seven days, as diagrammed in FIG. 5A.
Then: Generate the model, but declare models that their time is after start time of NANU as being unhealthy (i.e. not usable).
Example in case of PRN 18: The reference time = 374400 sec → time between start time of NANU and reference time = (403200 − 374400) = 28800 sec = 8 hrs → only the first model healthy, the rest declare unhealthy.

In Case II: The reference time is between the starting and ending times of the NANU, as diagrammed in FIG. 5B.
Then: Do not generate model.
Example in case of PRN 18: The reference time = 432000 sec → 403200 <= 432000 <= 455400.

In Case III: The reference time is after the ending time of the NANU, but not by later than seven days, as diagrammed in FIG. 5C.
Then: Attempt to generate the model, but if position integrity checks failed do not generate.
Example in case of PRN 18: The reference time = 496800 sec → time between end time of NANU and reference time = (496800 − 455400) = 41400 sec.

In Case IV: The Reference Time is outside of the NANU by more than seven days before or after.
Then: Generate the model without considering any NANU.

Table-IV lists the delta model parameters that are packed into thirty-nine bytes total for message transmission to the clients, e.g., 311-333 in FIG. 3.

TABLE IV

Delta Model Packing Design

| Byte Number | Parameter | Size (bytes) | Bit Allocations |
|---|---|---|---|
| 1-4 | E \| Axis | 4 | 17 \| 15 |
| 5-8 | $\Omega_n$ | 4 | 32 |
| 9-12 | Af1 \| N | 4 | 18 \| 14 |
| 13-14 | Msb1 IDot \| I0 | 2 | 1 \| 15 |
| 15 | R1me2 | 1 | 8 |
| 16-19 | M0 | 4 | 32 |
| 20-23 | SinW \| Lsb10 Crs | 4 | 22 \| 10 |
| 24-27 | CosW \| Lsb10 Crc | 4 | 22 \| 10 |
| 28-31 | Lsb11 IDot \| Lsb10 Cus \| Lsb11 Cuc | 4 | 11 \| 10 \| 11 |
| 32-35 | AenI \| Af0 | 4 | 18 \| 14 |
| 36-37 | Msb2 Crs \| Msb2 Crc \| Cis/Cic | 2 | 2 \| 2 \| 12 |
| 38-39 | Msb2 Cus \| Msb1 Cuc \| $\dot{\Omega}_n$ | 2 | 2 \| 1 \| 13 |

FIG. 6A represents a server model generator 600 in a background process that can be used to produce a usable LTCSM good for one week into the future. A process 602 runs continuously to find reference ephemerides and to parse any relevant NANU Advisories that have been broadcast. See FIG. 2, processes 204, 206, etc. Beginning at a start 604, a process 606 collects one week's worth of clock and ephemeride history for each GPS satellite into an ephemeris database. A process 608 does the initial refining of the satellite positions in the history. A process 614 integrates the orbital information over fourteen days. A process 612 computes the error corrections that are needed to find a fit with the integrated orbital information. A process 614 then fits models valid for eight hours each to the computed errors. These models are placed into a model database.

FIG. 6B represents a server client manager 620 that responds in real-time to requests for models from clients in the field. A new LTSCM message 622 arrives as a Java message service packet from server model generator 600 every time a new model is put into the model database. These are put into a model cache memory in process 624. The cache memory structure allows for a rapid response. A process 626 provides the latest models immediately from the model cache when a LTSCM request 628 comes in and is serviced by a LTSCM request handler 630. A process 632 forms the LTSCM reply into the formats illustrated in FIG. 3.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the scope of the invention.

What is claimed is:

1. An improved network-enabled extended ephemeris navigation system, comprising:
 a network server able to collect ephemeris, clock, and almanac information from orbiting GPS satellites, and to use that information to build up extended ephemeris predictions that will be valid and useful for at least a week;
 a mobile client able to request and use said extended ephemeris predictions in receiver position fix calculation;
 the improvement characterized by:
 a satellite position and clock compact model construction and database unit configured to constructs a compact short-term satellite model to be sent first in response to a request for extended ephemeris predictions from the mobile client, and configured to constructs several consecutive long-term satellite models, different than the compact short-term satellite model, each representing a unique portion of a day in at least a seven day series.

2. The improved network enabled extended ephemeris navigation system of claim 1, further comprising:
 a message sequence of long-term satellite models for transmission over a limited communications channel between the server and the mobile client that sends a full long-term satellite model followed by at least one delta long-term satellite model, wherein said delta long-term satellite model uses a number of data bits to describe how its corresponding long-term satellite model differs from the previous full long-term satellite model.

3. The improved network enabled extended ephemeris navigation system of claim 1, further comprising:
 a single-purpose GPS receiver for use as a reference station at the server and that is limited to downloading the Navigation Message.

4. The improved network enabled extended ephemeris navigation system of claim 1, wherein:
 the mobile client is configured to substitutes clock model information it obtains directly from orbiting GPS satellites for any clock model information previously obtained from the server.

5. The improved network enabled extended ephemeris navigation system of claim 1, wherein:
 the server is such that during a request for extended ephemeris predictions it responds first with a short-term compact satellite model for all GPS satellites; and the mobile client uses such short-term compact satellite model in a search to acquire and track said GPS satellites then visible to the mobile client.

6. The improved network enabled extended ephemeris navigation system of claim 1, wherein the satellite position and clock compact model construction and database unit further comprises:
 a process for collecting every satellite ephemeris and clock estimate as they arrive in real-time in a week-long moving window ending at the current time, and for integrating each update into running satellite clock and position models for respective GPS satellites that characterize all the forces acting on each satellite and propagate them in x,y,z position format.

7. The improved network enabled extended ephemeris navigation system of claim 6, further comprising:
 a process in which a one week ephemeris history is used to compute the expected errors second-by-second of one week of future orbit, in terms of delta x, delta y, delta z.

8. The improved network enabled extended ephemeris navigation system of claim 7, further comprising:
 a process configured in accordance with a model for modeling errors as a one orbital period reference curve with one-orbital period growth polynomial model, such that when the errors are graphed on a one-orbital period basis, a repeating characteristic shape can be identified with a measureable timebase that grows into the future, and such that a growth factor can be calculated.

9. The improved network enabled extended ephemeris navigation system of claim 8, wherein said model comprises a one-orbital period growth polynomial model with growth factors relating to a body axis angle of a satellite.

10. The improved network enabled extended ephemeris navigation system of claim 9, further comprising:
 a process to predict the position and clock errors one week into future, and to correct the orbit with expected errors.

11. The improved network enabled extended ephemeris navigation system of claim 1, further comprising:
 a four-hour short-term compact short-term satellite model (CSM) for sending to the mobile client when the mobile client sends its position along with its request for satellite models to the network server, and wherein a collection of such CSM's can effectively serve as a pseudo-almanac to support searching and acquisition.

* * * * *